(12) United States Patent
Dawes et al.

(10) Patent No.: US 7,146,101 B2
(45) Date of Patent: Dec. 5, 2006

(54) OPTICAL MEDIA MANAGEMENT CHANNEL

(75) Inventors: Ian Dawes, Ottawa (CA); Sanjay Kalyansundaram, Ottawa (CA); Gordon Harney, Ottawa (CA)

(73) Assignee: Altera Corporation, San Jose, CA (US)

( * ) Notice: Subject to any disclaimer, the term of this patent is extended or adjusted under 35 U.S.C. 154(b) by 695 days.

(21) Appl. No.: 10/035,494

(22) Filed: Nov. 8, 2001

(65) Prior Publication Data

US 2004/0208522 A1 Oct. 21, 2004

(51) Int. Cl.
*H04B 10/08* (2006.01)
*H04J 14/02* (2006.01)

(52) U.S. Cl. .............. 398/31; 398/33; 398/91

(58) Field of Classification Search ........... 398/30–33, 398/79, 91
See application file for complete search history.

(56) References Cited

U.S. PATENT DOCUMENTS

| 5,513,029 A | 4/1996 | Roberts |
| 5,654,816 A | 8/1997 | Fishman |
| 5,699,081 A | 12/1997 | Denkin et al. |
| 5,978,115 A | 11/1999 | Condict et al. |
| 6,018,406 A * | 1/2000 | Ishimatsu et al. ........... 398/181 |
| 6,038,047 A | 3/2000 | Nava et al. |
| 6,075,628 A | 6/2000 | Fisher et al. |
| 6,094,442 A * | 7/2000 | Okamoto et al. ........... 370/506 |
| 6,178,023 B1 | 1/2001 | Nava et al. |
| 6,233,078 B1 | 5/2001 | Harano et al. |
| 6,236,499 B1 | 5/2001 | Berg et al. |
| 6,433,903 B1 * | 8/2002 | Barry et al. .................. 398/79 |
| 6,661,973 B1 * | 12/2003 | Price et al. ................... 398/91 |
| 2001/0038475 A1 | 11/2001 | Wolf |
| 2002/0012144 A1 * | 1/2002 | Lin et al. ..................... 359/130 |

* cited by examiner

*Primary Examiner*—Dalzid Singh

(57) ABSTRACT

A network management communication infrastructure is provided that supports in-fiber signaling amongst the network components residing in an optical transport network. The network management communication infrastructure introduces an optical media management channel into each of the optical fibers that resides in an optical transport network.

10 Claims, 2 Drawing Sheets

OPTICAL MEDIA MANAGEMENT CHANNEL

FIELD OF THE INVENTION

The present invention relates generally to an optical transport network and, more particularly, to a network management communication infrastructure that will support in-fiber signaling between all of the network components residing in the optical transport network.

BACKGROUND OF THE INVENTION

In dense wavelength division multiplexing (DWDM) optical networks, managing the physical media by tracing signal paths is considered a very challenging task. Since the optical signals are analog signals, confirming connectivity and continuity is difficult without converting them to electrical signals. The problem is exacerbated when complex network elements such as all-optical switches, dynamically re-configurable optical add-drop multiplexers (OADM) etc. are added to the optical network. Optical networks currently do not have a complete data communication infrastructure that will support in-fibre signalling between all of the network elements.

Current techniques for detecting the presence and absence of discrete optical channels in an optical network use analog signals that propagated throughout the network, thereby making it susceptible to signal degradation as well as making it difficult to terminate and regenerate the signals at each node. Since most of the techniques rely on a sub-carrier in-channel dither, they impose an optical penalty which affects the overall link budget. In situations where wavebands are routed at an OADM site, current technologies rely on correlation of individual analog signals to determine the routing. Most importantly, these technologies rely on the carrier optical signal being present to determine the routing of the fibres. The nature of these technologies prevent them from being used as a network management communications channel.

Therefore, it is desirable to provide a network management communication infrastructure that will support in-fiber signaling between all of the network components residing in the optical network.

SUMMARY OF THE INVENTION

In accordance with the present invention, a network management communication infrastructure is provided that supports in-fiber signaling amongst the network components residing in an optical transport network. The network management communication infrastructure introduces an optical media management channel into each of the optical fibers that resides in an optical transport network.

For a more complete understanding of the invention, its objects and advantages, reference may be had to the following specification and to the accompanying drawings.

DETAILED DESCRIPTION OF THE PREFERRED EMBODIMENTS

Figure 1:
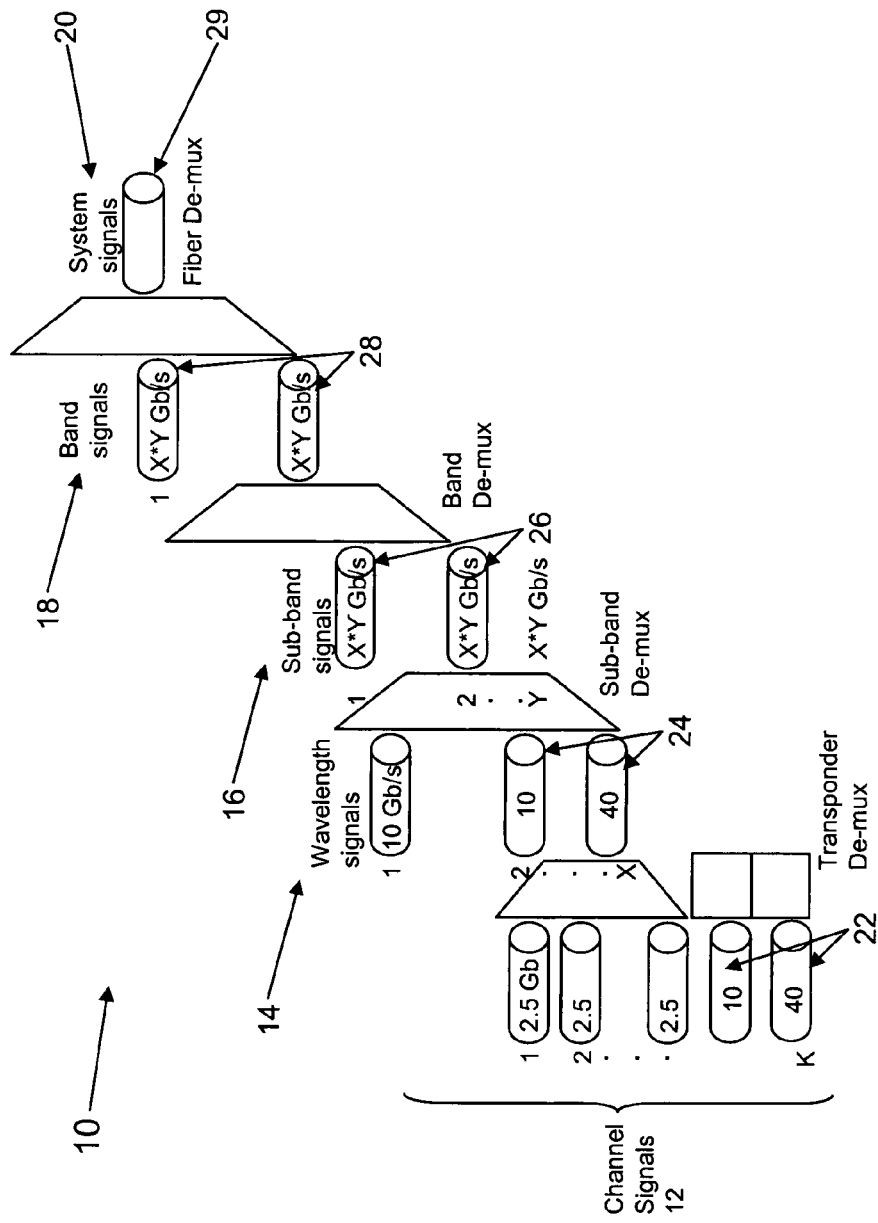
FIG. 1 is a diagram depicting an exemplary optical line hierarchy that may be employed in an optical transport network in accordance with the present invention.

An exemplary optical line hierarchy 10 that may be employed in an optical transport network is depicted in FIG. 1. In this example, the optical space associated with the optical transport network is partitioned into five optical layers: a channel layer 12, a wavelength layer 14, a sub-band layer 16, a band layer 18 and a fiber layer 20. While the following description is provided with reference to five optical layers, it is readily understood that more or less optical layers may be defined within the optical space.

To increase network capacity, numerous optical signals may be multiplexed together to form a single optical system signal as is well known in the art. At the finest granular layer 12, a plurality of optical channel signals 22 are selectively combined to form a plurality of optical wavelength signals 24. As a result, each channel signal becomes a member of a wavelength signal and the plurality of channel signals collectively define the wavelength layer 14.

Similarly, the plurality of optical wavelength signals 24 are selectively combined to form a plurality of optical sub-band signals 26. Each wavelength signal becomes a member of a sub-band signal and the plurality of sub-band signals collectively defines the sub-band layer 16. The plurality of optical sub-band signals 26 are in turn selectively combined to form a plurality of optical band signals 28. Each of the sub-band signals becomes a member of a band signal and the plurality of band signals collectively defines the band layer 18. The optical wavelength signals 24, optical sub-band signals 26 and optical band signals 28 may be referred to herein as intermediate optical signals. Lastly, the plurality of optical band signals 28 are combined to form an optical system (fiber) signal 29. The optical system signal 29 is then launched into the optical transport network.

In sum, optical signals are constituted in a line hierarchy or layered membership relationship, where membership is based on provisioning information. Although the invention is not limited thereto, layer membership is preferably based on the wavelength and/or data rate of the optical signal. For instance, optical data signals having proximate wavelengths within a predefined range of wavelengths become members of the same group. However, it is envisioned that spectrally separated optical data signals may also become members of the same group. In this way, the optical transport space is partitioned into different hierarchical layers.

Figure 2:
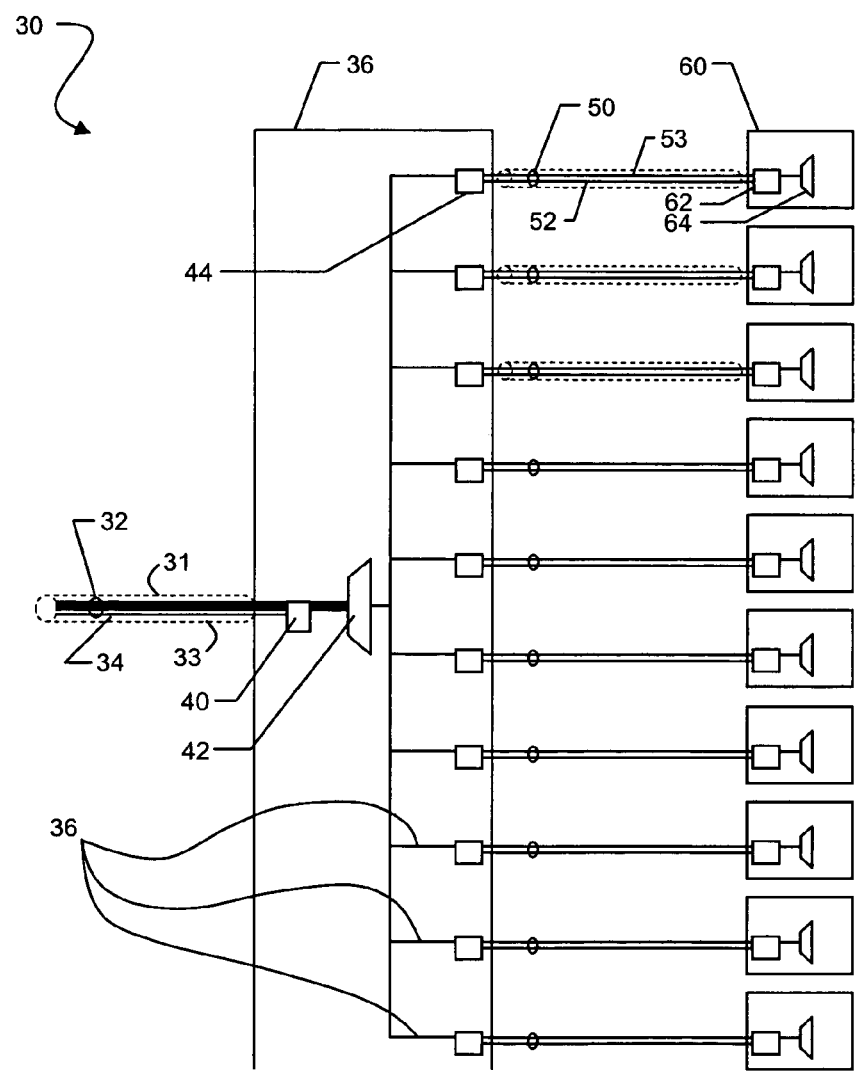
FIG. 2 is a diagram depicting an exemplary network element having an optical media management channel introduced into each of the optical fibers therein in accordance with the present invention.

FIG. 2 illustrates an exemplary network element 30 that may reside in an optical transport network. The network element 30 may be connected to one or more optical transport lines 31 that are operable to carry an optical system signal 32 therein. The optical bandwidth carried by each optical system signal 32 may be partitioned into a payload portion 34 and at least one optical supervisory (or network management) channel 33 The payload portion of the optical system signal 32 is composed of a plurality of optical data signals as described above; whereas the optical supervisory channel supports at least one optical management signal therein.

The optical transport line 31 terminates at a system level demultiplexing card 36 associated with the network element 30. The demultiplexing card 36 is generally operable to receive the optical system signal 32 from the optical transport line 31 and separate the optical system signal 32 into a plurality of intermediate optical signals 36. The plurality of intermediate optical signals 36 are then carried by a plurality of optical fibers 50 to other network components residing at the network element 30.

More specifically, the demultiplexing card 36 may include a system level management signal sink 40, a demultiplexer 42, and a plurality of card level management signal sources 44. The management signal sink 40 receives the optical system signal 32 from the optical transport line 31. The management signal sink 40 then separates the network management signal from the remaining payload portion of the optical system signal 32. The management signal sink 40 is preferably implemented with a filter and a photodetector as is well known in the art. The demultiplexer 42 receives the payload portion 34 of the optical system signal 32 and separates it into the plurality of intermediate optical signals 36 embodied therein.

In accordance with the present invention, an optical media management channel is introduced into each of the optical fibers that resides at the network element 30. To do so, a management signal source 44 is interposed between the demultiplexer 42 and each of the plurality of optical fibers 50 that connect to the demultiplexer 42. Each management signal source 44 is operable to introduce an optical management signal 52 into a corresponding optical fiber 50, such that the optical management signal 52 is transmitted at a wavelength that is sufficiently separated from the transmission wavelength range of the intermediate optical signal 53 traversing through the corresponding optical fiber. For example, the plurality of intermediate optical signals may be transmitted at wavelengths in the range of 1520 nm to 1610 nm; whereas the optical management signal may be transmitted at a wavelength of 1310 nm. In addition, the optical management signal is preferably transmitted at wavelengths that are not useable for transmitting long-haul optical data signals (e.g., having optical reach greater than 1000 km). In this way, an optical media management channel is defined for each optical fiber in the network element 30.

Data communication protocols employed by such links require some framing and rudimentary addressing capability. For instance, a protocol, such as HDLC, Ethernet or Packet over SONET, may be used as the point to point protocol for optical management signals traversing through an optical media management channel. Although the present invention is not limited thereto, it is further envisioned that the optical management signal is transmitted at a data rate on the order to of 0.1–100 Mb/s per link.

In a preferred embodiment, each management signal source 44 includes a laser source (e.g., edge emitting lasers) that is operable to generate an optical management signal 52 in conjunction with a filter or other signal combiner that combines the optical management signal 52 with the intermediate optical signal 53 that enter the corresponding optical fiber 50. It is to be understood that the optical management signal 52 may be transmitted over the optical fiber 50 even in the absence of an intermediate (payload) optical signal 53. Although this embodiment is presently preferred, it is envisioned that other suitable configurations for introducing an optical management signal are within the scope of the present invention.

As noted above, each of the optical fibers 50 are in turn connected to other network components that reside at the network element 30. In this example, each optical fiber 50 is connected to a corresponding band level demultiplexing card 60. The demultiplexing card 60 includes a management signal sink 62 and a demultiplexer 64. The management signal sink 62 receives an optical signal from the correspond optical fiber 50 and separates the optical management signal 52 from the intermediate optical signal 54. The intermediate optical signal may then be passed on to the demultiplexer 64.

The management signal sink 62 is preferably implemented with a filter and a photodetector.

The exemplary network element 30 has been described in terms of unidirectional network traffic. It is to be readily understood that the network element may support bi-directional network traffic. Thus, the management signal sink 40 may be joined with a management signal source to introduce as well as receive an optical management signal from the optical supervisory channel 33. Likewise, it is envisioned that the optical media management channel of the present invention may support bi-directional optical management signals. In this case, the management signal source 44 is joined with a management signal sink such that it is operable to receive and transmit an optical management signal via the media management channel; whereas the management signal sink 62 is joined with a management signal source such that it is operable to introduce and receive optical management signal via the media management channel.

For simplicity, only two demultiplexing stages are shown in FIG. 2. Therefore, in accordance with the previously described line hierarchy, the exemplary network element 30 partitions the optical system signal into a plurality of optical band signals which are in turn partitioned into a plurality of optical sub-band signals. However, it is to be readily understood that more or less demultiplexing stages may be needed to fully partition the optical system signal. To the extent that optical fibers are used to interconnect additional demultiplexing stages of a network element, it is to be understood that an optical media management channel is introduced into each of these optical fibers. Likewise, it is to be understood that network elements having different component configurations also employ an optical media management channel for each of the optical fibers associated with the network element. In this way, a network management communication infrastructure is provided that supports in-fiber signaling amongst all of the network components in a network element and all of the network elements residing in an optical transport network.

The optical media management channel of the present invention may be used to communicate various types of network management information. For instance, the optical media management channel may carry the error rate associated with the channel. Since the error rate information is based on digital signals, this approach provides a relatively accurate indication of the link integrity. In comparison to optical indicators of signal quality (e.g., optical signal to noise ratio), digital information is easier to acquire and process, thereby providing a better representation of the link quality.

In another instance, the optical media management channel may be used to perform waveband traces. In a typical optical add/drop multiplexer (OADM) site, the optical media management channel plays an important role in the detection of the routing. When setting up the OADM site, it may be assumed that the optical payload signals are not present at the site, and yet a network operator is expected to fiber up the system. In this case, the controller of a transmitting network element is assumed to have booted up with basic information, such as network element type, identifier, etc. The network operator at a receiving network element provisions the expected traces. Upon detecting the optical management signal on the optical transmitter shelf, the controller processes the incoming traces and alerts the network element about the detection of theses new traces and the ports in which they were received. The controller in turn compares the incoming trace with the expected trace value. If there is a mismatch, the controller alerts the network operator to the fact that the fibers have been misconfigured. In a situation where the expected traces are not provisioned, the incoming traces are reported to the network operator as they are received. If this is what the network operator expected to receive, then on acknowledgement, the traces can be made the provisioned traces. In the situation when the system is already up and running with a few wavebands already in service, adding new wavebands can be done without interrupting service on any existing wavebands. One skilled in the art will readily recognize other network management applications for the network management communication infrastructure of the present invention.

While the invention has been described in its presently preferred form, it will be understood that the invention is capable of modification without departing from the spirit of the invention as set forth in the appended claims.

What is claimed is:

1. A network element residing in an optical transport network, comprising:
    an optical transport line terminating at the network element, the optical transport line operable to carry an optical system signal therein;
    a demultiplexing component connected to the optical transport line, the demultiplexing component operable to receive the optical system signal and separate the optical system signal into a plurality of intermediate optical signals;
    a plurality of optical fibers connected to the demultiplexing component, and
    a plurality of management signal sources interposed between the demultiplexing component and the plurality of optical fibers, where each of the management signal sources introduces an optical management signal into a corresponding optical fiber, such that each of the optical fibers carries an optical management signal and one of the plurality of intermediate optical signals therein, the optical management signal being transmitted at a wavelength different than the wavelength range used to transmit the intermediate optical signal.

2. The network element of claim 1 wherein the optical management signal is transmitted at a wavelength that is spectrally separated from the transmission wavelength range for the plurality of intermediate optical signals.

3. The network element of claim 2 wherein the plurality of intermediate optical signals are transmitted at a wavelength in the range of 1520 nm to 1610 nm and each of the optical management signals are transmitted at substantially 1310 nm.

4. The network element of claim 1 wherein the optical management signal is transmitted in the absence of the intermediate optical signal.

5. The network element of claim 1 wherein at least one of the management signal sources includes a laser source operable to generate an optical management signal, and a signal combiner operable to combine the optical management signal from the laser source with the intermediate optical signal traversing through the corresponding optical fiber.

6. The network element of claim 1 further comprising a plurality of management signal receivers connected to the plurality of optical fibers, each of the management signal receivers operable to receive and separate the optical management signal from the intermediate optical signal traversing through the corresponding optical fiber.

7. A method for managing an optical transport network, comprising:
    terminating an optical transport line at a network element residing in the optical transport network, the optical transport line operable to carry an optical system signal and the optical system signal having a plurality of optical data signals embodied therein;
    routing the plurality of optical data signals amongst a plurality of optical fibers associated with the network element;
    defining an optical management channel for each of the plurality of optical fibers by interposing a management signal source between the optical transport line and each of the plurality of optical fibers; and
    transmitting an optical management signal from each of the management signal sources over a corresponding optical fibers, such that each optical fiber carries an optical data signal and an optical management signal.

8. The method of claim 7 further comprising the step of transmitting a first optical management signal over at least one of the optical management channels, the first optical management signal transmitted at a wavelength different than the wavelength range used to transmit an optical data signal through the corresponding optical fiber.

9. The method of claim 8 wherein the step of transmitting a first optical management signal further comprises selecting a wavelength that is spectrally separated from the wavelength range used to transmit the optical data signal.

10. The method of claim 9 wherein the first optical management signal is transmitted at substantially 1310 nm and the optical data signal is transmitted at a wavelength in the range of 1520 nm to 1610 nm.

* * * * *